(No Model.)
J. L. HUDSON.
HOE.
No. 253,053.  Patented Jan. 31, 1882.
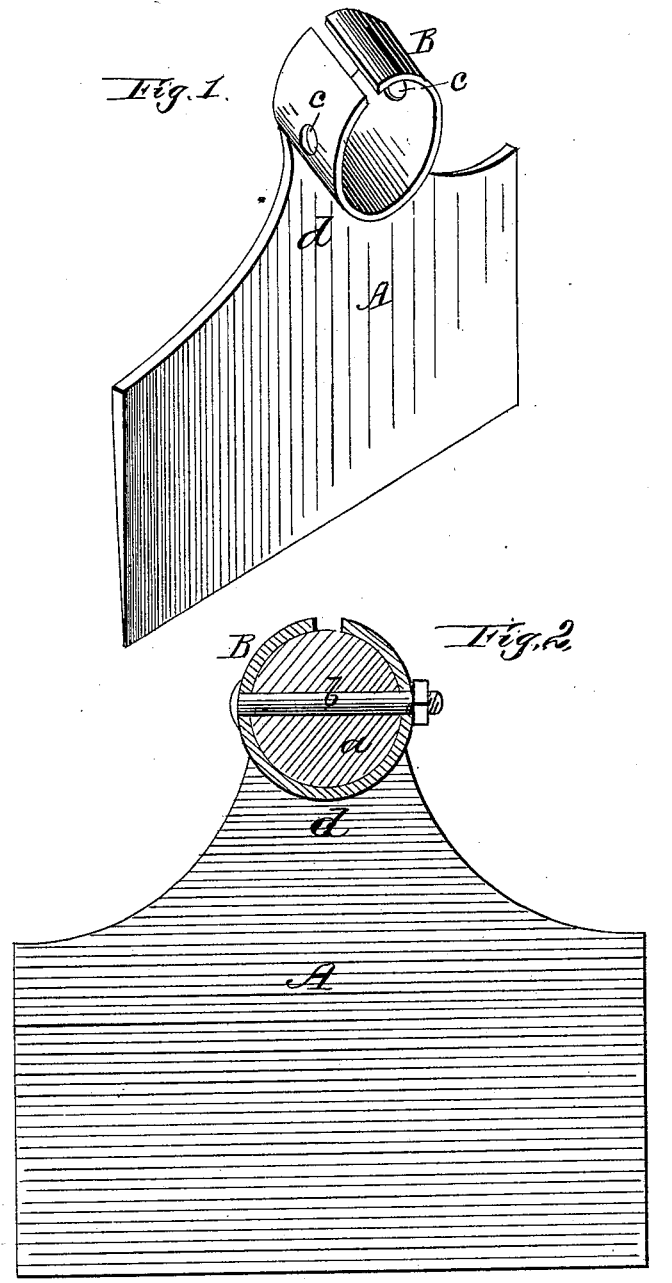
Witnesses:
W. C. McArthur
L. S. Miller
Inventor
John L. Hudson
per Chas. H. Fowler,
Attorney.

UNITED STATES PATENT OFFICE.

JOHN L. HUDSON, OF CUMMINGS, GEORGIA.

HOE.

SPECIFICATION forming part of Letters Patent No. 253,053, dated January 31, 1882.

Application filed July 14, 1881. (No model.)

*To all whom it may concern:*

Be it known that I, JOHN L. HUDSON, a citizen of the United States, residing at Cummings, in the county of Forsyth and State of Georgia, have invented certain new and useful Improvements in Hoes; and I do hereby declare that the following is a full, clear, and exact description of the same, reference being had to the annexed drawings, making a part of this specification, and to the letters and figures of reference marked thereon.

Figure 1 of the drawings is a perspective view of a hoe constructed in accordance with my invention; and Fig. 2 is a similar view, showing the manner of connecting it to the handle.

The present invention has relation to certain new and useful improvements in that class of hoes in which the eye is formed of two parts, or, in other words, split lengthwise.

Previous to my invention the two parts or sections of the eye were each formed with a flange having a screw-opening for the reception of a tightening-screw to draw them together after the end of the handle had been inserted, so that the eye would be tightly clamped around the handle. It is also common to pass a bolt through the sides of a closed eye, and through the handle of the hoe, to retain the end thereof within the same, so that by tightening the bolt the eye will be somewhat flattened.

The object of the invention is to improve the construction and manner of connecting the eye of the hoe to the handle over the above-described means, which objects are attained by the construction substantially as shown in the drawings and hereinafter described.

In the accompanying drawings, A represents the hoe, of the usual form, having an eye, B, for connecting thereto the usual handle, as shown at *a*. The blade of the hoe A, however, at the upper portion is cut away to form a shank, *d*. The eye B is split lengthwise, so that the eye can be sprung over the end of the handle. Simply drawing the eye tightly around the end of the handle is not sufficient, as has been the custom heretofore, from the fact that when the hoe is used for breaking clods the eye is apt to work loose and the flanges and tightening-screw jammed or otherwise injured to such extent as to impair their efficiency as a means of fastening. To remedy these defects it will be noticed that the two parts of the eye are not brought or drawn together around the end of the handle, but are simply sprung over the end, and afterward a bolt, *b*, is driven transversely through the handle and through holes *c* in the eye B. This bolt passing through the handle prevents the slipping or turning of the hoe; also makes it more secure and much stronger, as the pressure is entirely upon the handle. Were the two sections of the split eye drawn so tightly together around the handle as to bring the flanges in contact, should the hoe become loose on the end of the handle, it would be impossible to tighten it—an objection which is entirely overcome by springing or spreading laterally the two parts of the split eye, instead of drawing them together. Without cutting away the upper portion of the hoe to form the shank *d*, it would be impracticable to use bolts to contract or tighten the eye on handle, as this cutting away of the blade admits of an easy expansion or contraction, which could not be obtained in the ordinary or common form of blade. Hence it will be seen that there is a co-operation in the split eye B and shank *d* with the bolt passing through the eye and handle. Simply passing a bolt through a closed eye and through the handle is not of itself sufficient, as the wedging of the handle would simply expand the eye, and not tighten it.

Having now fully described my invention, what I claim as new, and desire to secure by Letters Patent, is—

As an improved article of manufacture, the hoe A, cut away at its upper portion to form a shank, *d*, and having the split eye B, with holes *c* in opposite sides thereof to receive a transverse tightening-bolt through the handle, substantially as and for the purpose set forth.

In testimony that I claim the above I have hereunto subscribed my name in the presence of two witnesses.

JOHN L. HUDSON.

Witnesses:
R. A. EAKES,
GEO. E. SIMS.